US009940352B1

(12) United States Patent
Satapathy et al.

(10) Patent No.: US 9,940,352 B1
(45) Date of Patent: Apr. 10, 2018

(54) METHOD AND SYSTEM FOR SMART DATA INPUT RELAY

(71) Applicants: Rohit Satapathy, Mountain View, CA (US); Sapeksha Vemulapati, Mountain View, CA (US); Kapil Gupta, Sunnyvale, CA (US); Vikram Saxena, Cupertino, CA (US); Gaurav Mishra, Cupertino, CA (US)

(72) Inventors: Rohit Satapathy, Mountain View, CA (US); Sapeksha Vemulapati, Mountain View, CA (US); Kapil Gupta, Sunnyvale, CA (US); Vikram Saxena, Cupertino, CA (US); Gaurav Mishra, Cupertino, CA (US)

(73) Assignee: Relcy, Inc., Moutain View, CA (US)

( * ) Notice: Subject to any disclaimer, the term of this patent is extended or adjusted under 35 U.S.C. 154(b) by 276 days.

(21) Appl. No.: 14/988,596

(22) Filed: Jan. 5, 2016

Related U.S. Application Data

(60) Provisional application No. 62/100,050, filed on Jan. 5, 2015.

(51) Int. Cl.
*G06F 17/30* (2006.01)
(52) U.S. Cl.
CPC .... *G06F 17/30424* (2013.01); *G06F 17/3056* (2013.01); *G06F 17/30554* (2013.01)
(58) Field of Classification Search
CPC ......... G06F 17/30424; G06F 17/30554; G06F 17/3056

(Continued)

(56) References Cited

U.S. PATENT DOCUMENTS 6,256,633 B1 * 7/2001 Dharap ............. G06F 17/30867
8,073,850 B1 * 12/2011 Hubbard ................ G06Q 30/02
705/14.52

(Continued)

OTHER PUBLICATIONS

White, Ryen W., et al., "Predicting User Interests from Contextual Information", SIGIR '09, Boston, MA, Jul. 19-23, 2009, pp. 363-370.*

(Continued)

*Primary Examiner* — Robert Stevens
(74) *Attorney, Agent, or Firm* — K&L Gates LLP; Jordan A. Kwan

(57) ABSTRACT

Systems and methods are disclosed to enable delivering a contextually relevant action for an underlying focal point of a communication (an "entity") between users over computing devices. Delivery of a contextually relevant action entails identifying the entity and associated descriptors or amplifying words in the communication surrounding the entity, reviewing databases of actions taken with respect to the identified entity and associated descriptors, reviewing the functions and features of platforms and applications supported on users' computing devices, computing correlations between the actions taken and entity involved and computing devices' available functions and features, and selecting a contextually relevant action from the computed correlation. The selected contextually relevant action is displayed simply as an executable action for a user to take or as a description of the entity or as a series of possible executable actions to take.

19 Claims, 7 Drawing Sheets

(58) Field of Classification Search
USPC .......................................................... 707/758
See application file for complete search history.

(56) References Cited

U.S. PATENT DOCUMENTS

| | | | | |
|---|---|---|---|---|
| 9,363,654 | B2* | 6/2016 | Sullivan | G06F 3/0481 |
| 2010/0192055 | A1* | 7/2010 | Shaked | G06F 17/30616 |
| | | | | 715/234 |
| 2010/0262487 | A1* | 10/2010 | Edwards | G06Q 30/02 |
| | | | | 705/14.43 |
| 2011/0313968 | A1* | 12/2011 | Dumais | G06F 17/30241 |
| | | | | 706/52 |
| 2012/0158688 | A1* | 6/2012 | Ramachandran | G06F 17/30967 |
| | | | | 707/706 |
| 2013/0144610 | A1* | 6/2013 | Gordon | H04W 4/00 |
| | | | | 704/201 |
| 2014/0149449 | A1* | 5/2014 | Bhola | G06F 17/30654 |
| | | | | 707/769 |
| 2016/0101122 | A1* | 4/2016 | Megiddo | A61K 9/0019 |
| | | | | 514/53 |
| 2017/0098159 | A1* | 4/2017 | Sharifi | G06F 3/0484 |

OTHER PUBLICATIONS

Dong, Anlei, et al., "User Action Interpretation for Personalized Content Optimization in Recommender System", CIKM '11, Glasgow, Scotland, UK, Oct. 24-28, 2011, pp. 2129-2132.*

* cited by examiner

METHOD AND SYSTEM FOR SMART DATA INPUT RELAY

CROSS-REFERENCES TO RELATED APPLICATIONS

This application claims the benefits of U.S. Provisional Application 62/100,050, filed Jan. 5, 2015, and titled, "METHOD AND SYSTEM FOR SMART DATA INPUT RELAY" the disclosures of which are incorporated herein by reference in its entirety and for all purposes.

TECHNICAL FIELD

The subject matter disclosed herein generally relates to identifying a keyword or key context (also referred to as an "entity") of communications across computing devices and delivering an actionable reference related to the context of identified entities. In some embodiments, users' computing devices are connected to one another through a knowledge analysis system configured to identify the correct context of communications between the users and predict actions the users will take within that context. In some embodiments, the predicted action is displayed within the communication between the users.

BACKGROUND OF THE INVENTION

Human communications in the modern digital age are capable of connecting and communicating a deluge of information. The sheer volume of information that may be shared between users of computing devices presents numerous opportunities for a recipient of such information to interpret multiple meanings or consider a variety of uses a sender of the information may intend. Compounding the sheer volume of information and multitude of meanings possible within communications that relay such information are the numerous formats such communications may come in, such as email, text messages, social media posts, emails, customer feedback comments on a vendor website, or information circulated within a closed environment.

It is difficult and time consuming for users to integrate, communicate, or appreciate a particular singular meaning or intended use of information sent over computing devices. This inefficiency is at odds with the increased expectations users have of their computing devices and services. Companies and information service providers configure and operate an ever increasing number of computer systems to increase the number of sources of information that have traditionally been unavailable. A need exists for efficiently and quickly communicating a desired aspect or context for shared information that may have a litany of meanings or uses.

SUMMARY OF THE INVENTION

Providing a contextually relevant action for a key word or key context (hereafter referred to as an "entity" or "entities") within a communication between or among users' computing devices is described. More specifically, some embodiments relate to methods and systems for identifying and optimizing a desired description of an entity in real time and relaying contextually relevant information and actions for that description regardless of the platforms involved. Illustrative examples of entities include, but are not limited to, places, people, products, songs or other media. The contextually relevant information or actions associated to entities, or their descriptions, include hyperlinks to webpages, mobile application landing pages, mobile application service actions (such as a "navigate to" action of a mapping mobile application), purchase options or reference documents. One of skill in the art can comprehend other entities or means of presenting contextually relevant information or actions beyond these examples.

Communication between users' computing devices may refer to emails, text messages, social media posts, or website postings such as comments or reviews sections. One of skill in the art will appreciate multiple communications methods applicable to embodiments disclosed herein. Some embodiments are performed on, through, or between computing devices such as mobile or smartphones, tablet computers, laptop computers, desktop computers, automobile dashboard computers, and other similar devices.

Contextually relevant information can provide a richer set of information than simple plain text within a communication. In some embodiments, contextually relevant information further provides a call to action, this is, a contextually relevant action. Merely by way of example, in some embodiments, contextually relevant information within a communication between users' mobile devices is predicted and presented on a screen of the recipient as an action for the recipient to take; in other words, the contextually relevant action becomes part of the communication and enables the recipient to interact with the underlying information directly, rather than perform a separate series of data manipulations across multiple webpages or platforms to interpret and act on the communicated information received from the sender.

Accurate entity input or interpretation among computing device users typically involves several manipulations to convey the intended meaning or context or use of the entity. Traditional search engines, such as Google® and Ski®, perform information retrieval for a single audience only and require a user to sort and select which source of information is desired for interaction. Further, presentations of search results related to an intended entity by a conventional search tool are typically limited to plain text characters. For entities communicated in plain text, users cannot directly interact with the communication, or generate subsequent actions or information that may otherwise be enabled by a computing device's software. Conventional information sharing across computing devices between users thus requires several steps to understand the intended context or use of the communicated entity.

In an example of conventional information sharing via text messaging, a sender must accurately describe the intended context of an entity via plain text (such as distinguishing a popular title as a book or movie, or the particular location of a popular chain coffee shop), a recipient must correctly interpret the description of the sent entity to properly identify it, and the recipient must then independently research information regarding the context of the entity.

In the independent research step, a recipient must separately and manually search for information about a specific entity (such as from a website), sort through the search results to find a result the recipient believes matches the sender's intent, and then access that information. Similarly, if a sender beforehand desires to provide specific information regarding an entity, the sender first manually searches for the desired information about the entity, copies that information, enters the copied information into a communication platform, and then transmits.

To illustrate the conventional process: a sender desires to meet a recipient at a coffee shop; the sender can initially text the recipient the name of the coffee shop. The sender can also look up the address of the coffee shop in a separate window, copy it, and then return to the text window and send the copied address to the recipient. Alternatively, the sender can give a basic description for the location and the recipient can receive the name of the coffee shop in a text window of the recipient's computing device, and then turn to a separate window to look up the specific address or directions to the location. A sender could open a map application and forward a location reference for the location, but the recipient's computing device may not host the particular mapping application required to access the location reference.

In this and other conventional communications of entities seeking to relay contextual information about the entity, multiple substeps are required. On mobile devices, these steps are particularly tedious as mobile devices small screens typically present only one source of information on the device's screen at a time, even though the information is spread across multiple windows or requires multiple screens to fully interact with. Currently, avoiding miscommunication about the true purpose of a transmitted entity is an inefficient process. Unintended transaction costs are also possible as the failure to provide accurate information in a timely fashion can lead to uninformed decisions with unknown costs later, or foregoing decisions altogether. Information technology as employed by disclosed embodiments alleviate these costs and inefficiencies.

In some embodiments as described herein, a knowledge analysis system predicts the contextually relevant action surrounding an entity embedded in a communication between or among users in real time by correlating search results of, among other things, the users' own computing history, the computing history of other users, the mobile applications hosted by the users' computing devices that are capable of supporting certain actions, and amplifying words surrounding the entity. As described, "users" may refer to either or both the sender or recipient. The knowledge analysis system thereby determines likely possible actions for users to take relevant to the entities within the communication, obviating the need for users' to perform independent research to execute an intended or desired action. In some embodiments, the contextually relevant action is presented to the users as a plain text character with an underlying hyperlink to a given action, in some embodiments a separate overlay to the communication includes contextually relevant actions such as a hyperlink to a webpage or opening a mobile application to perform the action. In some embodiments, the knowledge analysis system includes entity information such as the definition and pictures as part of the contextually relevant action.

In some embodiments, a user's past entity historical trends and activities are analyzed to build a knowledge association. As contextually relevant actions are executed, or in some cases rejected in favor of other contextually relevant actions, a knowledge analysis system records the actions to update historical trends and activities related to certain entities. In some embodiments, therefore, a sender's own entity history of interaction and trends are prioritized for predicting actions to take with certain entities. In some embodiments the recipient's entity historical trends and activities are prioritized for prediction, and in some embodiments global historical trends and activities are prioritized. In some embodiments, the sender or recipient can weight a prioritization; for example, if a sender is asking a recipient for a recommendation of a particular cuisine, the knowledge analysis system can weight the contextually relevant actions historically implemented by the recipient more (relative to the sender).

Numerous benefits are achieved by way of embodiments of the present invention over conventional techniques. For example, in some embodiments, predicting the desired entity's contextually relevant action allows a sender to convey the intent of a communication, or a recipient to understand the meaning, faster than if the sender/recipient switched between multiple screens to locate and attach the desired intent. As an illustrative example, a user sending a text message to a recipient enters the title of a book and the embodiment predicts the desired action related to that entity, such as an Amazon® link to purchase the book or a book review, and relays this contextually relevant entity information to the recipient. In some embodiments, the title of the book is still delivered in plain text, but the recipient may press the entity in the text message or otherwise select an action button on a screen or keyboard to retrieve the contextually relevant action of an entity in the communication. The benefits of these and other embodiments reduce time to transmit desired information and enables faster decision making.

Computing functions are also improved by implementing embodiments of the invention. Network computing cycles are reduced, or eliminated completely, by fewer transmissions between a user and third party, and by fewer separate searches by a user or third party to the communication. Fewer network computing cycles reduces the bandwidth and network data a computing device consumes as compared to conventional methods, enabling faster performance. Further, computing device power is improved; a knowledge analysis system leveraged to a user or third party intention for exchanging information regarding an entity reduces time a computing device or device operator (a user or third party) is functioning, therefore reducing power consumption in addition to reduced network footprint.

These and other embodiments of the invention along with many of its advantages and features are described in more detail in conjunction with the text below and attached figures.

BRIEF DESCRIPTION OF THE DRAWINGS

Some embodiments are illustrated by way of example and not limitation in the figures of the accompanying drawings.

DETAILED DESCRIPTION OF THE INVENTION

Figure 1:
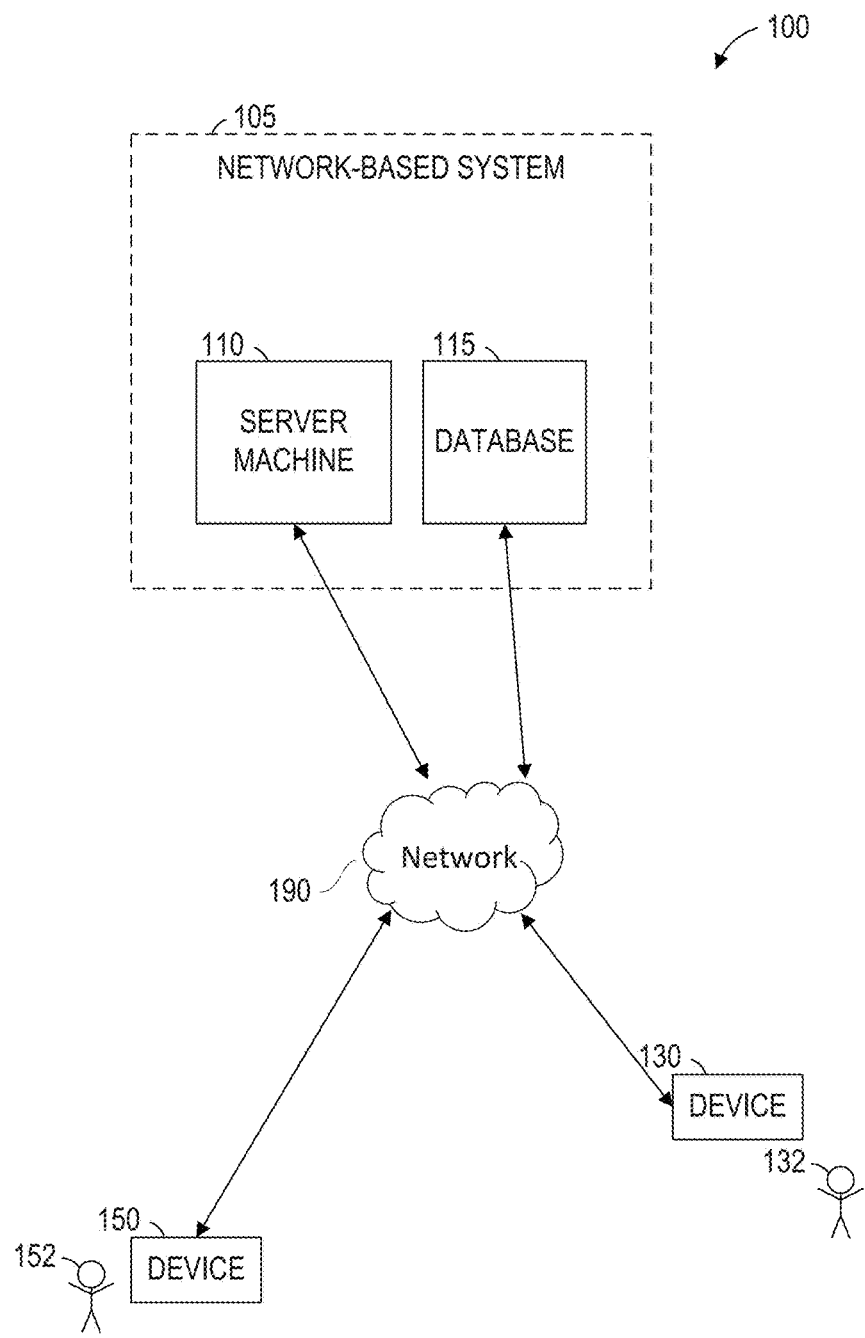
FIG. 1 is a network diagram illustrating an example network environment suitable for performing aspects of the present disclosure, according to some embodiments.

The following detailed description should be read with reference to the drawings when appropriate, in which identical reference numbers refer to like elements throughout the different figures. The drawings, which are not necessarily to scale, depict selective embodiments and are not intended to limit the scope of the invention. The detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. As used in this specification and the appended claims, the singular forms "a," "an," and "the" include plural referents unless the context clearly indicates otherwise.

Examples merely demonstrate possible variations. Unless explicitly stated otherwise, components, and functions are optional and may be combined or subdivided, and operations may vary in sequence or be combined or subdivided or omitted. In the following description, for purposes of explanation, numerous specific details are set forth to provide a thorough understanding of example embodiments. It will be evident to one skilled in the art, however, that the present subject matter may be practiced without these specific details.

Systems, methods, and apparatuses are described to interpret, analyze, predict, and associate computing device user inputs and deliver actionable information for entities (the focal point of a communication between or among users). Technologies related to embodiments of the present invention support relaying the contextually relevant action of an entity within communications or references without requiring users or third parties to research that entity through separate information sources or search engines.

In some embodiments, a knowledge analysis system predicts contextually relevant actions for a particular entity in a communication between users (senders and/or recipients) on computing devices. In some embodiments, the knowledge analysis system is an intermediary between the users' computing devices and accesses the communication between them. In some embodiments, the knowledge analysis system automatically identifies entities within the communication by distinguishing nouns within the communication. In some embodiments, the knowledge analysis system automatically identifies entities within the communication by distinguishing verbs within the communication. In some embodiments, a user can prompt an entity by highlighting the entity within the text or labeling with an explicit identifier. In other words, as opposed to hashtags or @ symbols seen in social media outlets, identification of an entity, or presentation of the related contextually relevant action, is not limited to explicit selection by a user.

In some embodiments, the knowledge analysis system performs a series of searches to identify at least one relevant action associated with the entity. In some embodiments, searches for relevant actions comprise searching for metadata such as coding tags or references. In some embodiments, the knowledge analysis system searches the users' computing devices for applications and programs related to the identified entity; in some embodiments the knowledge analysis graph searches the Internet for webpages associated with the entity. In some embodiments, a user determines the search parameters that a knowledge analysis system will use to determine eligible relevant actions. For example, a user can choose mobile applications as the only source of relevant actions, or a hybrid of a sender's mobile applications and a recipient's mobile applications as the source of relevant actions. One of skill in the art will appreciate further parameters a user may take to identify at least one relevant action associated with the entity.

In some embodiments, a database of historical trends and activities is accessed by the knowledge information system. A database of historical trends and activities includes, in some embodiments, a global log of actions taken that are associated with the identified entity across all accessible computing devices, such as by locating a metatag of the identified entity within a code sequence for the action of the global log. A database of historical trends and activities includes, in some embodiments, a user centric log of actions taken with the identified entity, such as by locating a metatag of the identified entity within a code sequence for the action on the user's computing device (either the sender or recipient of the communication). In some embodiments, the historical trends and activities accessed by the knowledge analysis system is limited to identified relevant actions within parameters set by a user. For example, if a user sets a parameter of relevant actions identified by a knowledge analysis system as those only capable of being performed on a mobile application, the knowledge analysis system in turn will only access those parts of a database of historical trends and activities that relate to the entity in a mobile application context.

In some embodiments, the knowledge analysis system identifies amplifying words within the communication. Amplifying words can vary by embodiment, and include but are not limited to articles, adjectives and adverbs within the communication that are otherwise self defining or limited to a single context and therefore require no further contextually relevant information or action to accurately describe. Merely as an example of an amplifying word, in some embodiments, time is an identified amplifying word.

In some embodiments, a correlation is computed among a search for relevant actions, the frequency of an action as recorded within a database of historical trends and activities, and the amplifying word or words. For illustrative purposes, in some embodiments the knowledge analysis system identifies the entity "Starbucks®" and the amplifying word "review" in an example communication between users. The knowledge analysis system initiates a search across the Internet and locates corporate sponsored webpages, venues serving coffee, job application portals, and the like. The knowledge analysis system further searches the users' computing devices and locates a Yelp® mobile application, a mobile purchasing application, and similar customer service mobile applications. The knowledge analysis system additionally searches a database of historical trends and activities of all users of the knowledge analysis system to determine the actions most frequently taken with the Starbucks® entity or "review" amplifying word. The knowledge analysis system also searches a particular user's historical trends and activities with either the Starbucks® entity or "review" amplifying word.

Merely for illustrative purposes related to the foregoing example, the knowledge analysis system can detect that for the given inputs (Starbucks® and "review"), globally the most common action taken is to review purchase orders of Starbucks® products, while the particular user's most common action is to write a customer service review for an entity in the same communication with the word "review" in it, and that the user has a customer review mobile application such as Yelp® and a food purchasing mobile application such as Order Ahead®. The knowledge analysis system can then compute a correlation between these factors, for example the number of times the user chooses the same action as the global trend or the number of times the user executes a mobile application to perform an action as opposed to a website portal, and determine an hierarchy of contextually relevant actions the user can take based on a ranking of computed correlations. After determining the hierarchy of actions, the knowledge information system can select at least one contextually relevant action, such as the contextually relevant action with the highest computed correlation, and deliver the contextually relevant action as part of the communication.

In some embodiments, such determination processes occur concurrently or in real time with a first user delivering a communication to at least one second user. In other embodiments, the determination occurs after delivery of the communication, so that the process only begins if the communication sender or recipient requests contextually relevant actions for entities within the communication.

In some embodiments, the knowledge analysis system processes an acknowledgment by the user with respect to the selected contextually relevant action. In some embodiments, this acknowledgment is a confirmation from the first user that the selected contextually relevant action is the desired action the first user intends to relay to at least one second user. In some embodiments, this first user confirmation is recorded for future knowledge analysis prediction. In some embodiments, the acknowledgment is a recordation of the action taken by the at least one second user. In some embodiments, the acknowledgment is a request from at least one second user for a security credential or an application program interface (API) key to execute a particular contextually relevant action. In some embodiments, the knowledge analysis system retrieves the requested acknowledgment (such as a security credential or API key, or even the download instructions for a particular mobile application) and delivers it to the user.

In some embodiments, an affirmative interaction or dismissal in favor of another contextually relevant action updates respective databases of historical trends and activities and in turn influences future correlation computations in prediction processes by the knowledge analysis system. In some embodiments, the executed action prompts subsequent actions by the knowledge information system. For example, for an executed contextually relevant action to purchase movie tickets for a particular showing, the knowledge information graph can determine the user's location and distance to the movie theater the tickets correspond to, and access mapping applications on the user's computing device such as Waze® to prompt the user with directions, traffic updates and departure time suggestions for reaching the theater on time.

In some embodiments, the delivery of the contextually relevant action includes all possible contextually relevant actions in descending order of correlation, such as in a drop down menu or in a window pane or tile overlaying the communication. In some embodiments, only the contextually relevant action (such as a mobile application action button) with the highest computed correlation is presented to reduce the screen space required to present the contextually relevant action. In some embodiments, a user can select a different contextually relevant action than the one presented by swiping or pressing a "next" or "close button" on a presented contextually relevant action.

In some embodiments, the communication is visual such as a text message, email, or document. In some embodiments, the visual contextually relevant action is operably coupled with communication. In some embodiments, operably coupling is by connecting the entity with the contextually relevant action through direct visual display such as a tile or window pane with the contextually relevant action within. In some embodiments, operably coupling is by connecting the entity with the contextually relevant action through a recall function, such that the contextually relevant action only displays if recalled or requested by a user.

In some embodiments, the communication is aural such as a speech or voice message. In some aural embodiments, the knowledge analysis system delivers a visual cue of entities within the aural communication and at least one contextually relevant action related thereto. For example, a recipient may listen to a sender's voice message of "meet me on campus" and the knowledge analysis system identifies the entity "campus" as the school the user attends, the amplifying words "meet" and "me" and produces search results for locations on the school the two users have checked into before on mobile applications such as Foursquare® and delivers a visual tile or information card or text message with information on the location to the recipient before, during, or after the recipient has listened to the voice message.

In some embodiments, the knowledge analysis system detects a globally popular contextually relevant action that is not supported on the user's computing device, for example the user's computing device does not host a mobile application that is commonly used for interacting with the particular entity as correlated with the amplifying words. In some embodiments, the user can request an application program interface (API) key to access the contextually relevant action from the knowledge analysis system. In some embodiments, the knowledge analysis system delivers the API to the user with delivery of the contextually relevant action, in some embodiments such API delivery is only delivered upon request.

In some embodiments, the knowledge analysis system further delivers credential information. In some embodiments, credential information includes a verification of the sender, such as a security measure that the listed sender is in fact the intended sender of the communication with the contextually relevant action. In some embodiments, credential information includes the number of times a contextually relevant action has been executed by other recipients of communications from a sender as a proxy for the trustworthiness of particular sender (for example if a communication is between a sender and recipient that the knowledge analysis system determines have never exchanged communications).

Turning now to the figures, FIG. 1 illustrates a network relationship 100 for delivering contextually relevant actions related to entities within communication among users' computing devices operably coupled to a network-based knowledge analysis system. Network relationship 100 includes user 132 operating computing device 130, user 152 operating computing device 150, and network based system 105 such as a knowledge analysis system. User 132 or user 152 may be one of a sender or recipient of communications and user 132 or user 152 as depicted may represent one or more respective sender or recipient operating one or more computing device 130 and computing device 150. Computing device 130 or computing device 150 may be a mobile device, desktop computer, laptop computer, tablet computer, or other computing device configured to operate any one of the functionalities described herein. Connecting user 132 or user 152 to network based system 105 through computing device 130 or computing device 150 is network 190. Network 190 may be a wireless network (such as wide area network, local area network), ethernet connections or other wired connection, or other suitable network system for linking computing devices.

Network based system 105 can include a server machine 110 configured to perform contextually relevant action prediction and delivery according to some embodiments as further described in this detailed description, and a database 115. Database 115 may store a collection of recorded actions taken with respect to contextually relevant actions, or available functionalities a computing device 130 or computing device 150 may perform. In some embodiments, database 115 includes actions on a global scale; in some embodiments, database 115 includes actions on smaller scales of select users.

Server machine 110 may access database 115 to determine global or user-centric histories and trends to more accurately predict how a given user 132 or user 152 may intend to relay information about an entity within a communication. For example, if a contextually relevant action for purchasing movie tickets through a movie ticket purchasing mobile application is the most common action taken with respect to the entity "Star Wars®" the server machine 110 can incorporate that most common action in computing a correlation for predicting how any one particular user 132 or user 152 may intend to interact with the entity "Star Wars®" in a communication between the two users.

In some embodiments, user 132 or user 152 is a sender of a communication or recipient of a communication directly between user 132 and user 152, such as a text message or email between the two. In some embodiments, user 132 or user 152 indirectly communicate, such as user 132 uploads a document to the Internet with entities embedded and user 152 reads the document and requests additional information or actions for the entities within the document; in this situation, the communication can be said to be passive between user 132 and user 152.

In some embodiments, network based system 105 identifies entities within communications between users 132 and 152, searches for eligible relevant actions that may be taken with respect to entities within the communications, accesses database 115 to determine histories and trends of actions taken with respect to the entities or relevant actions, identifies amplifying words that indicate how a particular entity intends to be acted upon, and computes a correlation among these factors to predict a contextually relevant action to deliver in connection with the communication.

Figure 2:
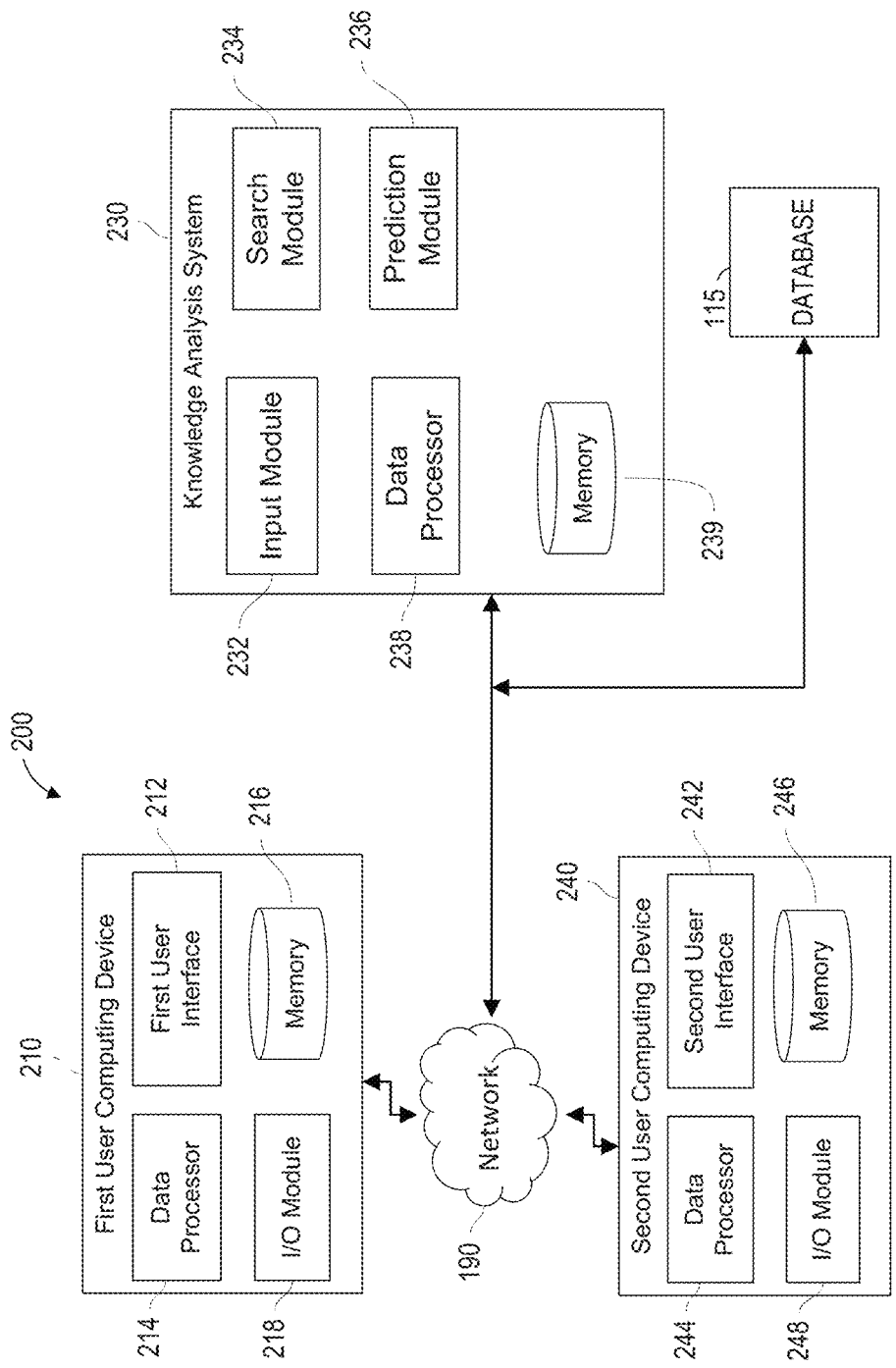
FIG. 2 illustrates a system diagram showing a first user computing device connected to a second user computing device operably coupled to a knowledge analysis system, according to some embodiments.

FIG. 2 further illustrates a system relationship among a first user computing device 210 (which may be computing device 130 or computing device 150 as depicted in FIG. 1), second user computing device 240 (which may be computing device 130 or computing device 150 as depicted in FIG. 1), knowledge analysis system 230 (which may be network-based system 105 as depicted in FIG. 1), all connected through network 190 (which may be network 190 as depicted in FIG. 1).

In some embodiments, first user computing device 210 receives a communication prompt in first user interface 212. In some embodiments, first user interface 212 is a data entry field for receiving text, in some embodiments is a voice recognition system (for instance collecting the speech of a user through a phone call or voice message or speech recording), in some embodiments is a photo recognition system. In some embodiments, first user interface 212 is a custom keyboard operated by the present assignee, though other custom keyboards are of course possible. In some embodiments, the custom keyboard includes action keys configured to prompt presentation of, and scrolling through, contextually relevant actions of entities within a selected communication. First user computing device 210 also includes data processor 214, a memory 216, and input/output (I/O) module 218 to facilitate functioning on the device and communication outside the device through network 190 and implementation of instructions to execute any of the functionalities described herein.

In some embodiments, concurrent with input of a prompt into first user interface 212, knowledge analysis system 230 interprets the input and predicts a contextually relevant action. In some embodiments, this concurrent prediction can provide an automatic completion to the input in first user interface 212. In some embodiments, knowledge analysis system 230 begins to predict a contextually relevant action following entry into interface 212.

In some embodiments, knowledge analysis system 230 receives input to first user interface 212 from I/O module 218 of first user computing device 210 and through network 190 and input module 232. The input module identifies entities and amplifying words within the communication input to first user interface 212.

In some embodiments, search module 234 identifies entities within the communication (such as by distinguishing nouns or verbs within the communication) performs a series of searches related to the identified entities to identify relevant actions to take with respect to the entity. In some embodiments, search module 234 searches first user computing device 210 or second user computing device 240 to determine the mobile applications or programs hosted and supported by the respective computing devices. In some embodiments, search module 234 searches the Internet for content related to the entity, such as by identifying metadata identifiers with the entity name. In some embodiments, search module 234 searches database 115 (as described in FIG. 1) for historical trends and activities for entities or relevant actions. In some embodiments, a user can set parameters on search module 234 to only search for relevant actions from certain sources or with particular metrics (such as relevant actions taken within a certain geographic region or within a specified time frame). In some embodiments, search module 234 delivers its collective results to prediction module 236.

In some embodiments, prediction module 236 analyzes the sourced information from search module 234 to compute a correlation among the factors. In some embodiments, the prediction module computes the correlation as a function of what the historical trends and activities from database 115 identified as the most common actions taken with respect to the identified relevant actions and available mobile applications and platforms of the users' computing devices. In some embodiments, prediction module 236 selects the most popular relevant action from the global historical trends and activities as determined from database 115. In some embodiments, database 115 includes a user's own historical trends and activities. For example, in some embodiments prediction module 236 sources historical trends and activities from the second user only and ignores global historical trends and activities associated with the entity. In some embodiments, prediction module 236 incorporates identified amplifying words to further refine the correlation as taken from a database of historical trends and activities.

To illustrate, a first or second user may set a parameter of relevant actions to be limited to Internet webpages, and a communication may include "leap day" as an entity and "next" as the amplifying word. Search module 234 can retrieve a variety of webpage links listing the frequency and occurrence and descriptions of Leap Day, and identify which Internet browsing tools are available on the respective computing devices, collectively these are combined—the link to the webpage through a particular browsing tool—to create a pool of relevant actions for that entity. The prediction module 236 then accesses historical trends and activities to determine most common actions taken among the possible relevant actions, and incorporates the amplifying words to compute a correlation among all factors for the most likely action a user is going to take among the relevant actions given the amplifying words and historical trends and activities (in other words, a contextually relevant action).

In some embodiments, computed correlations are ranked into an hierarchy of contextually relevant actions. In some embodiments, prediction module 236 selects at least one contextually relevant action, such as the one with the highest correlation score of the hierarchy of contextually relevant actions, and delivers it as part of the communication between first user computing device 210 and second user computing device 240.

In some embodiments, the delivery is received through I/O module 248 on second user computing device 240 as a visual cue to the contextually relevant action within the communication, such as a pop-up or tile or overlay within the screen displaying the communication. In some embodiments, the delivery is embedded in the communication but is not seen or otherwise presented until a user requests presentation, such as through a keyboard stroke or prompt action on the screen. In some embodiments, plain text of the communication as entered into first user interface 212 is automatically replaced with the contextually relevant action selected by knowledge analysis system 230. In some embodiments, the first user is presented with the option to replace the plain text with at least one contextually relevant action, such as by selecting from a drop down menu or menu bar. In some embodiments, selection of a particular contextually relevant action occurs by tapping the contextually relevant action in the screen.

In some embodiments, only a single contextually relevant action is delivered. In some embodiments, a user adjusts the number of contextually relevant actions to choose from (e.g. the top five computed correlations) or in some embodiments designates certain contextually relevant actions to always or never deliver. In some embodiments, delivery occurs only after a first user has specifically confirmed a particular contextually relevant action, thus permitting a user to preview the contextually relevant action before relaying within the communication. One of skill in the art will recognize other user preferences that can adjust how many and in what manner contextually relevant actions are presented.

For illustrative purposes only, in one embodiment of delivery of contextually relevant actions within text message exchanges, an input for the entity "Guardians of the Galaxy" is entered into first user interface 212 and analyzed by knowledge analysis system 230. Search module 234 searches various sources, such as the Internet and the users' devices, global historical trends and activities related to "Guardians of the Galaxy" within a database 115 to source relevant actions and returns movie reviews and local show times and ticket prices. Prediction module 236 then selects the most likely contextually relevant action by determining what the particular user most commonly selects, what the global pool of users most commonly selects, how frequently a user and global pool choose the same action, and delivers the determined contextually relevant action via network 190. A data processor 238 and memory 239 facilitate functioning of system 230 through implementation of instructions to execute any of the functionalities described herein.

In some embodiments, the contextually relevant action is received on the second user computing device 240 in second user interface 242. In some embodiments, second user interface 242 is a text message window; in some embodiments second user interface 242 is a mobile application landing page; in some embodiments, second user interface 242 is a webpage portal. One of skill in the art can apply other various second interfaces. A second user can then access and interact and complete subsequent actions directly with the contextually relevant action associated to the entity from the second user interface 242. In an illustrative example of receiving show times for "Guardians of the Galaxy," the second user can purchase tickets directly by selecting the a contextually relevant action for the entity in a movie ticket purchase mobile application rather than indirectly purchase tickets by search for ticket purchase options on other platforms or screens.

Second user computing device 240 includes a data processor 244 (also referred to as a processor), a memory 246, and an I/O module 148 to facilitate functioning of second user computing device 240 through implementation of instructions to execute any of the functionalities described herein.

Some embodiments do not require both a sender and a recipient. For example, in some embodiments an author of a document links contextually relevant action for an entity within the content of the document. In such an embodiment, as an author writes the document a knowledge analysis system recognizes an entity and predicts the desired information the author wishes to convey. In such an embodiment, a second user is not an active part of the communication. The desired contextually relevant action the author wishes to convey could be a link to a disclosure statement on file with the Securities and Exchange Commission's online filing system (such as the Electronic Data Gathering, Analysis, and Retrieval system—EDGAR) in an example of a document discussing the business profile of a publicly traded company. In another example, the desired information is a particular LinkedIn® profile in examples of the author writing an employment guideline or hiring protocol document. One of skill in the art can apply various contextually relevant actions desired by an author with a general second user audience in mind or even no audience intended. For example of some embodiments of the invention, the contextually relevant action linked to the entity is for the author's own use and reference, thereby reducing the need for reference files (electronic or otherwise) stored in a separate location. Or stated differently, the first user and the second user can be the same.

Figure 3:
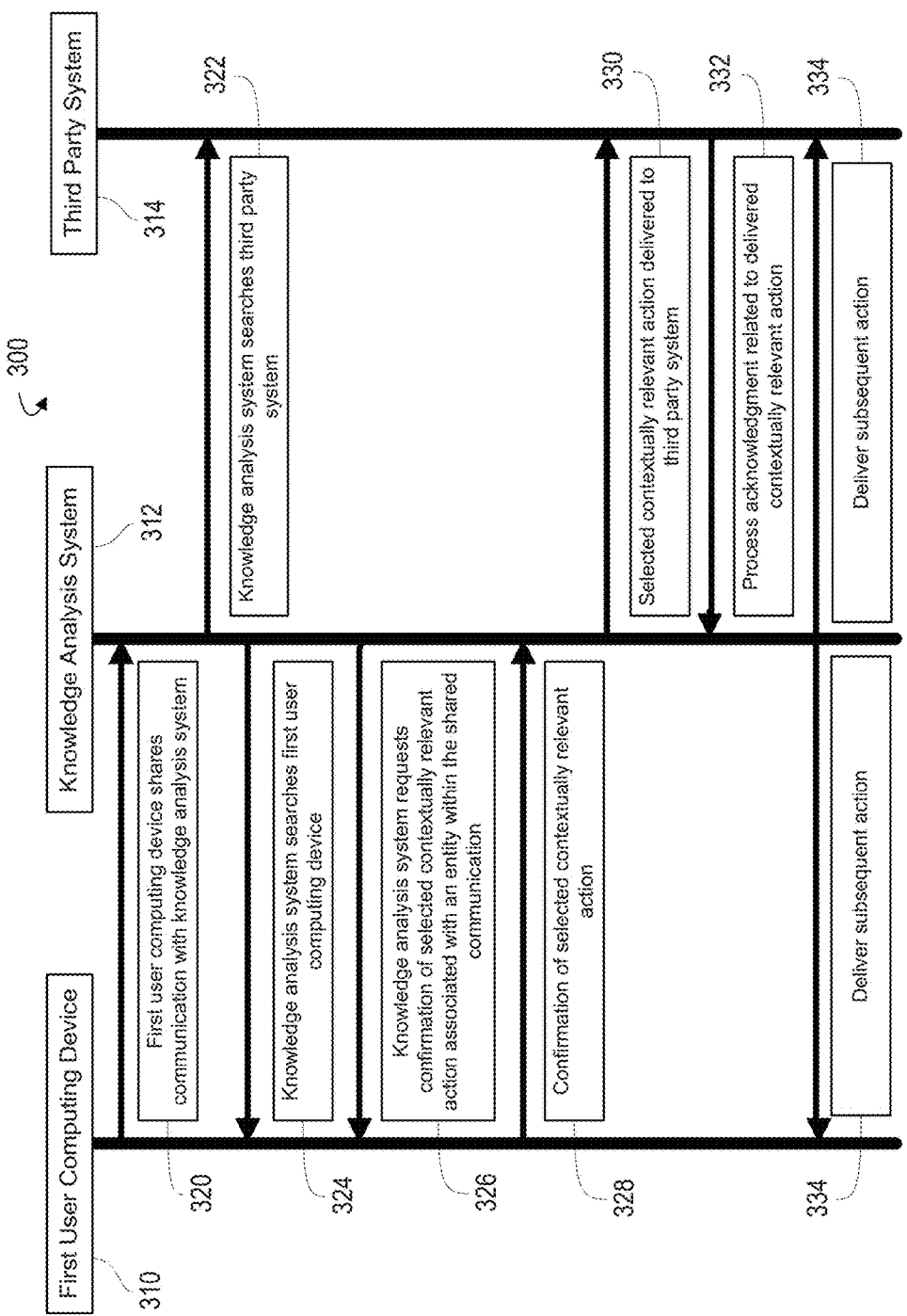
FIG. 3 illustrates a sequence diagram of the interaction between a first user computing device, knowledge analysis system, and third party system for identifying and sharing contextually relevant actions in communications, according to some embodiments.

FIG. 3 illustrates a sequence of interactions between users and a knowledge analysis system. As depicted in FIG. 3, in some embodiments, at 320 a first user computing device 310 shares a communication comprising an entity with a knowledge analysis system 312. At 322, the knowledge analysis system accesses a third party system 314, such as the Internet or a second user computer device, to determine eligible relevant actions as a function of the entity within the communication and supportable actions among the involved computing devices. In some embodiments, at 324, the knowledge analysis system 312 searches the first user computing device 310 for supportable actions such as by determining the mobile applications on first user computing device 310.

Once the knowledge analysis system 312 selects a contextually relevant action, as more fully described throughout this disclosure, in some embodiments at 326 the knowledge analysis system 312 requests confirmation via first user computing device 310 that a selected contextually relevant action is the desired contextually relevant action a user intends to relay within the communication. In some embodiments, at 328 the knowledge analysis system receives confirmation and at 330 delivers the contextually relevant action to a third party system. In some embodiments, delivery at 330 is conducted without confirmation from first user computing device 310. In some embodiments, a third party system is a second user computing device, such as second user computing device 240 as described in FIG. 2. In some embodiments, a third party system is database 115 as described in FIG. 1 or FIG. 2 to add to the knowledge analysis prediction functionality.

In some embodiments, at 332 an acknowledgment from third party system 314 is processed. In some embodiments, acknowledgment at 332 is a confirmation that the contextually relevant action was received and the action was executed. In some embodiments, acknowledgment at 332 is a request from third party system 314 for additional information, such as a security credential, or API key, or download request for a particular mobile application.

In some embodiments, at 334, the knowledge analysis system 312 delivers a subsequent action to either a first user computing device 310 or third party system 314. In some embodiments, the subsequent action is a link to a download portal for a particular mobile application, or a security credential, or an API key. In some embodiments, the subsequent action is a reminder to perform an action related to an earlier executed contextually relevant action, such as an alarm and driving directions to a theater for earlier purchased movie tickets.

It should be appreciated that the specific sequence illustrated in FIG. 3 provides a particular sequence of interaction between a first user computing device 310 and a knowledge analysis system 312 and a third party system 314. Other sequences of steps may also be performed according to the embodiment. For example, some embodiments may perform the steps outlined above in a different order. Moreover, the individual steps illustrated in FIG. 3 may include multiple sub-sequences as appropriate to the individual step. Furthermore, additional steps may be added or removed depending on the particular applications. As mentioned for some embodiments, the knowledge analysis system 312 begins predicting the contextually relevant action concurrent, or in real time, with the entry into a first user computing device 310. In some embodiments, the sequences of FIG. 3 instead begin subsequent to entry of an entity to a first user computing device 310. One of skill in the art would recognize many variations, modifications, and alternatives.

Figure 4:
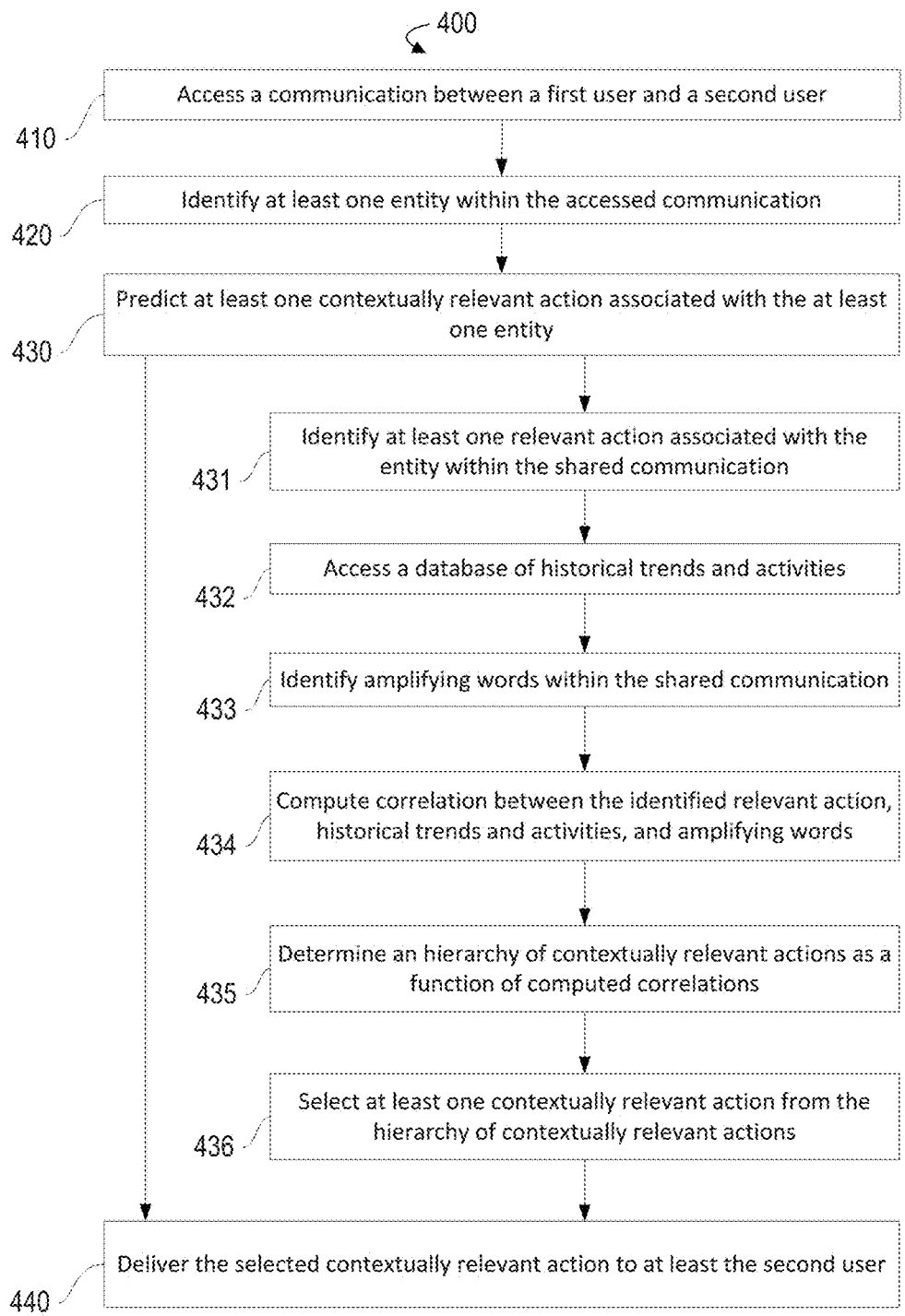
FIG. 4 illustrates an example method of accessing communications between computing device users and delivering contextually relevant actions related to entities within the communications, according to some embodiments.

FIG. 4 illustrates a flowchart of method 400 for relaying a contextually relevant action associated with entities in communications between computing device users. Method 400 is initiated at 410 by accessing a communication between a first user and a second user. In some embodiments, the users are natural persons but in some embodiments users are automated systems. For an example of an embodiment of the invention employing an automated system, an alarm may initiate a communication with other users.

In some embodiments, at 420 at least one entity is identified within the communication. At 430, at least one contextually relevant action is predicted; the contextually relevant action predicted is a function of association with the identified entity within the communication.

In some embodiments, step 430 includes additional substeps. At 431, a search across various information sources, such as the Internet and various computing devices is conducted to identify a pool of possible relevant actions to take that involve the identified entity. In some embodiments identification of relevant actions is by matching the metadata of certain functionalities of information on the Internet or computing devices and their programs with that of the identified entity. In some embodiments, a user may adjust which sources of information are accessed to identity relevant actions, such as be limiting to only the Internet or only certain devices.

In some embodiments, at 432, a database of historical trends and activities is accessed. The database in some embodiments includes all activities taken with regard to a given entity or relevant action across all users. In some embodiments, the database includes only the historical trends and activities of certain users.

In some embodiments, at 433 amplifying words within the communication are identified. At 434, a correlation among the identified relevant actions, historical trends and activities, and amplifying words is computed. By computing a correlation, an hierarchy of contextually relevant actions can be constructed or determined at 435 from the pool of eligible identified relevant actions. In some embodiments, the amplifying words prioritize certain identified relevant actions. In some embodiments, the historical trends and activities prioritize certain identified relevant actions.

In some embodiments, at 436 at least one contextually relevant action from the hierarchy of contextually relevant actions is selected. In some embodiments, the contextually relevant action with the highest correlation score among the hierarchy of contextually relevant actions is selected. In some embodiments, a designated number of contextually relevant actions from the hierarchy are selected.

In some embodiments, at 440, the selected contextually relevant action is delivered to at least the second user. In some embodiments, the selected contextually relevant action is also delivered to the first user.

For illustrative purposes of the effect of method 400, rather than a user looking up local movie times for a particular movie and ticket prices and theaters showing the movie and transcribing all of this data into a communication to another user, the user simply enters the title of the movie and a knowledge analysis system determines a show time and ticket price at a local theater and selects a contextually relevant action to purchase tickets at a particular location and time for the particular movie. The contextually relevant action could be a link to a webpage or to a mobile application for purchasing the tickets. A user that receives the contextually relevant action can interact directly, avoiding multiple messages between the users to determine the intent surrounding the entity (the movie) and avoiding having to engage multiple search options and screens and platforms to determine mutually agreed upon information.

It should be appreciated that the specific steps illustrated in FIG. 4 provide a particular method of relaying contextually relevant actions according to some embodiments. Other sequences of steps may also be performed according to the embodiment. For example, some embodiments may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of skill in the art would recognize many variations, modifications, and alternatives.

Figure 5A:
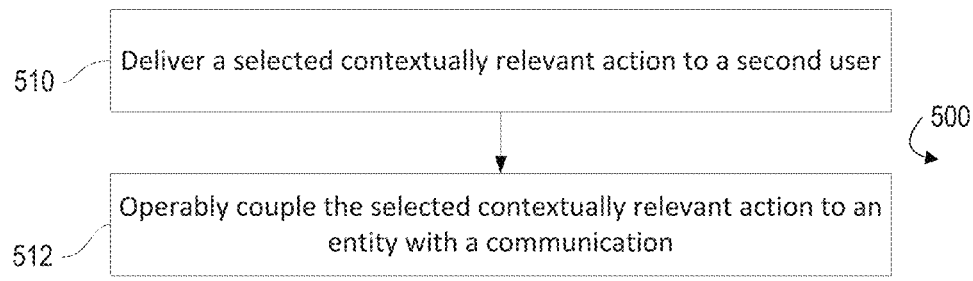
FIGS. 5A-C illustrate example methods of ancillary actions taken by a knowledge analysis system incident to delivering contextually relevant actions related to entities within a communication among computing device users, according to some embodiments.
Figure 5B:
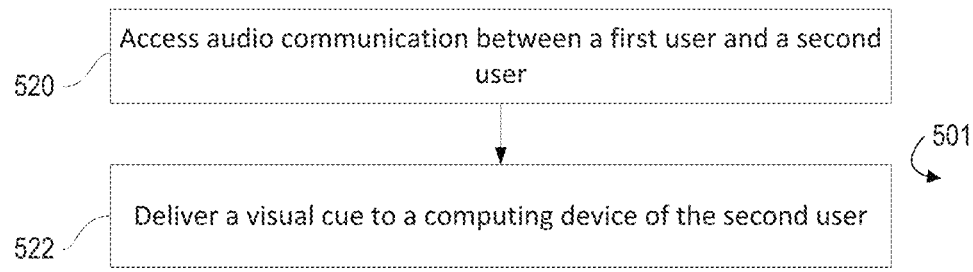
Figure 5C:
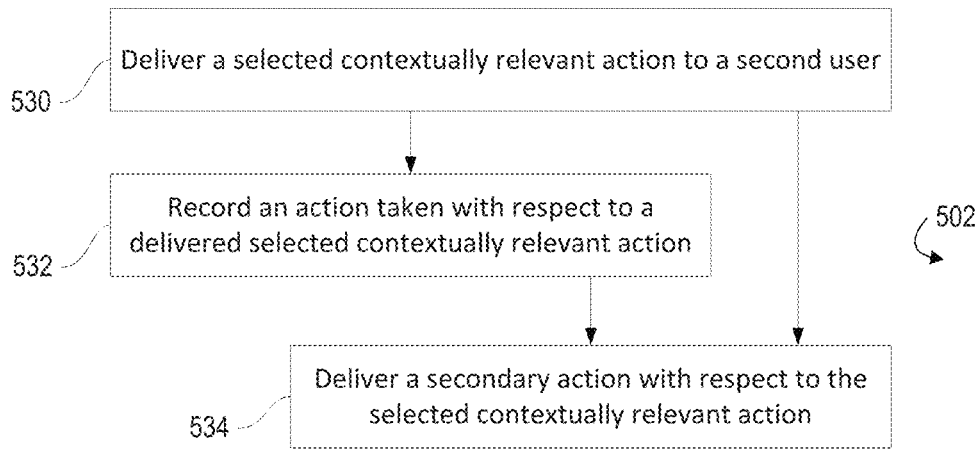

FIGS. 5A-C depict alternate steps and actions that may be taken in addition to method 400 as described above. FIG. 5A depicts method 500 wherein step 510 coincides with step 440 of method 400. Subsequent to step 500 of delivering the selected contextually relevant action to a second user, at 512 the selected contextually relevant action is operably coupled to the communication. In some embodiments, operably coupling at 512 is inserting a visual cue, such as a popup window or tile above the entity in the communication such that pressing or selecting the visual cue initiates the action of the contextually relevant action. Other methods of operably coupling the selected contextually relevant action for visual communication is further described in conjunction with FIGS. 6A-C.

FIG. 5B depicts method 501, wherein step 520 is a derivative of step 410 of method 400. Step 520 begins by accessing an audio or aural communication between users. In some embodiments, method 501 includes method 400 between steps 520 and 522. In some embodiments, at 522 a visual cue is delivered to the second user presenting a selected contextually relevant action as a visual cue in similar fashion as step 512 described above. For example, in some embodiments the audio communication accessed at 520 is a voice message between a first and second user; method 400 selects a contextually relevant action and at 522 a visual cue is delivered for the contextually relevant action to the second user, despite no underlying visual communication to attach or embed or operably couple the visual cue to. In some embodiments, the visual cue delivered at 522 is a popup window or tile, in some embodiments, the visual cue is delivered in a text message or email.

FIG. 5C depicts method 502, wherein step 530 coincides with step 440 of method 400. After delivering a selected contextually relevant action at 530, the action taken with respect to the delivered contextually relevant action is recorded at 532. In some embodiments, the recorded action is affirmative execution of the action delivered; in some embodiments the action taken is a rejection of the action delivered, indicating the need to select a new or different contextually relevant action. In some embodiments, recording the action taken updates databases, such as database 115 as described in FIG. 1 or FIG. 2, with the action taken to influence future predictions, correlation computations, and selections of contextually relevant actions. In some embodiments, at 534 a secondary action is delivered. In some embodiments, delivery of the secondary action at 534 is subsequent to recording an action at 532, in some embodiments delivery of the secondary action at 534 occurs without recording at 532 as a precursor step. In some embodiments, delivering a secondary action at 534 comprises sending a reminder of a previous contextually relevant action (for example, time to depart for a movie a user purchased tickets for), or delivering a security credential, recommendation for a mobile application supporting a selected contextually relevant action, or API key.

Figure 6A:
FIGS. 6A-C illustrate examples of visual templates, as displayed to computing device users, of contextually relevant actions related to entities within communications, according to some embodiments.
Figure 6B:
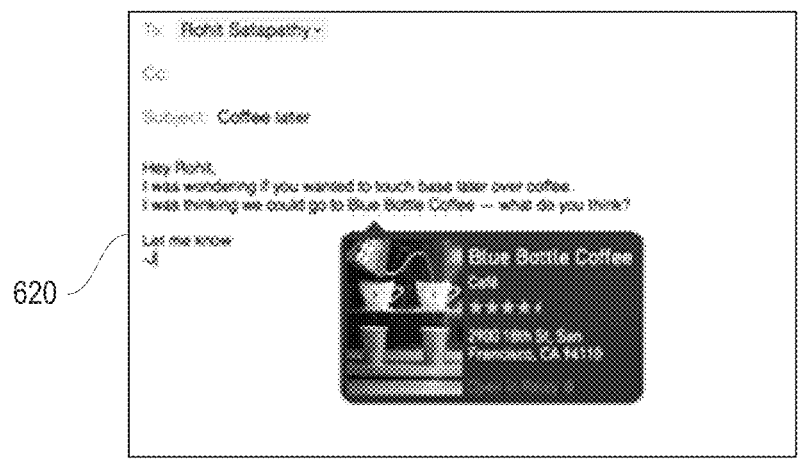
Figure 6C:
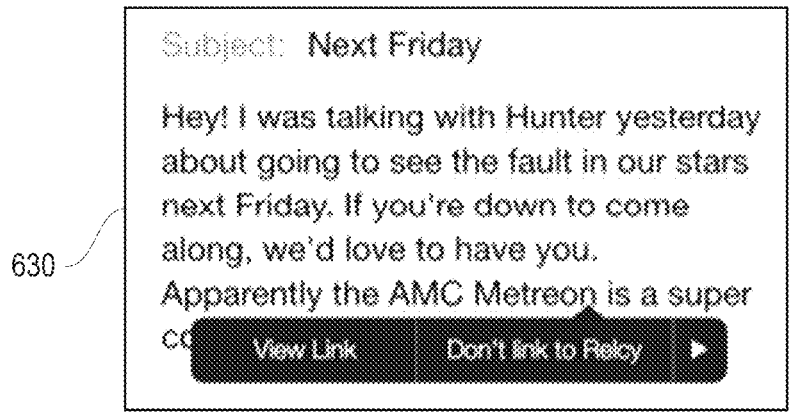

FIGS. 6A-C illustrate sample visual displays of contextually relevant actions delivered with communications between users' computing devices.

FIG. 6A depicts visual display 610 of contextually relevant action within a text message between a user and a recipient. Visual display 610 displays the contextually relevant action as a window above the identified entity. In some embodiments, the identified entity is highlighted or underlined; a user (sender or recipient) then presses or clicks the highlighted or underlined area to display the contextually relevant action which may be presented as a tile or popup window or navigate to a separate landing page with a list of other high computed correlation contextually relevant actions determined by a knowledge analysis system. In some embodiments, pressing or clicking the highlighted or underlined entity or contextually relevant action directs the user directly to applications or webpages associated with the entity for further interaction.

In some embodiments, the contextually relevant action includes a name of the entity and a link to a description of the entity in a third party platform (such as one operated by the present assignee). In some embodiments, and as depicted in FIG. 6B for an email platform communication, the contextually relevant action includes additional information such as the address of an entity, customer rating, and a link to execute a particular action such as driving directions based on the computed correlation of the knowledge analysis system on the most likely action a user is going to take with respect to a given entity.

FIG. 6C depicts visual display 630 of options may engage with for engaging a contextually relevant action. In some embodiments, as shown in display 630, a user chooses to view the link provided in a window or chooses not to follow the link, and no other information regarding the entity or actions to be taken are presented.

In some embodiments, not depicted, visual displays may show contextually relevant action for an entity without a specific recipient. For example, a news release for a car manufacturer includes the entity of Elon Musk with a link to further contextually relevant action about him. In these embodiments, the author of the news release has a general audience for sharing the contextually relevant action. In some embodiments, the entity within the communication (which may include a document with no immediate direct recipient or audience) has not been preselected with contextually relevant action by the user or author. In such an embodiment, the interface of the recipient or reader detects the presence of an entity and a knowledge analysis system performs the interpretation, analysis, prediction, and presentation of contextually relevant action despite no such interpretation, analysis, prediction, and presentation occurring by the user/author that initially relayed the communication with the entity.

Other embodiments present alternative options for viewing. According to some embodiments previously discussed, visual displays 610, 620, or 630 may include at least one link displayed in a menu bar or drop down menu within the same screen or pane or tile as the contextually relevant action, and such menus present alternative contextually relevant actions a user may initiate.

Figure 7:
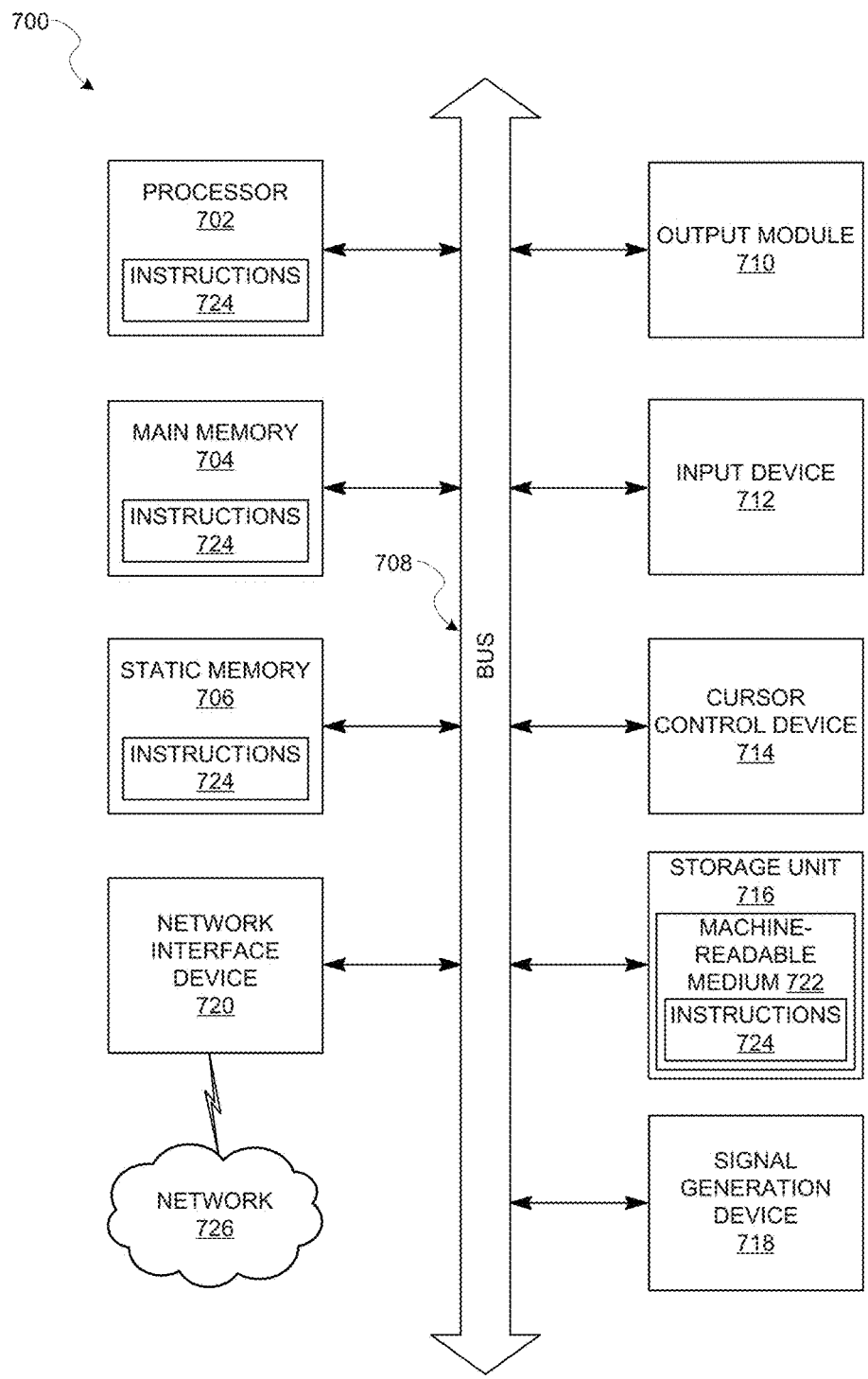
FIG. 7 illustrates a block diagram illustrating components of a machine, according to some example embodiments, able to read instructions from a machine-readable medium and perform any one or more of the methodologies discussed herein.

Referring to FIG. 7, the block diagram illustrates components of a machine 700, according to some example embodiments, able to read instructions 724 from a machine-readable medium 722 (e.g., a non-transitory machine-readable medium, a machine-readable storage medium, a computer-readable storage medium, or any suitable combination thereof) and perform any one or more of the methodologies discussed herein, in whole or in part. Specifically, FIG. 7 shows the machine 700 in the example form of a computer system (e.g., a computer) within which the instructions 724 (e.g., software, a program, an application, an applet, an app, or other executable code) for causing the machine 700 to perform any one or more of the methodologies discussed herein may be executed, in whole or in part.

In alternative embodiments, the machine 700 operates as a standalone device or may be connected (e.g., networked) to other machines. In a networked deployment, the machine 700 may operate in the capacity of a server machine 110 as depicted in FIG. 1 or a client machine in a server-client network environment, or as a peer machine in a distributed (e.g., peer-to-peer) network environment. The machine 700 may include hardware, software, or combinations thereof, and may, as example, be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 724, sequentially or otherwise, that specify actions to be taken by that machine. Further, while only a single machine 700 is illustrated, the term "machine" shall also be taken to include any collection of machines that individually or jointly execute the instructions 724 to perform all or part of any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The processor 702 may contain microcircuits that are configurable, temporarily or permanently, by some or all of the instructions 724 such that the processor 702 is configurable to perform any one or more of the methodologies described herein, in whole or in part. For example, a set of one or more microcircuits of the processor 702 may be configurable to execute one or more modules (e.g., software modules) described herein.

The machine 700 may further include an input and output module 710 (e.g., a plasma display panel (PDP), a light emitting diode (LED) display, a liquid crystal display (LCD), a projector, a cathode ray tube (CRT), or any other display capable of displaying graphics or video) configured to display any one of the interfaces described herein. The machine 700 may also include an input device 712 (e.g., a keyboard or keypad), a cursor control device 714 (e.g., a mouse, a touchpad, a trackball, a joystick, a motion sensor, an eye tracking device, or other pointing instrument), a storage unit 716, a signal generation device 718 (e.g., a sound card, an amplifier, a speaker, a headphone jack, or any suitable combination thereof), and a network interface device 720.

The storage unit 716 includes the machine-readable medium 722 (e.g., a tangible and non-transitory machine-readable storage medium) on which are stored the instructions 724 embodying any one or more of the methodologies, functions, or interfaces described herein, including, for example, any of the descriptions of FIGS. 1-6. The instructions 724 may also reside, completely or at least partially, within the main memory 704, within the processor 702 (e.g., within the processor's cache memory), or both, before or during execution thereof by the machine 700. The instructions 724 may also reside in the static memory 706.

Accordingly, the main memory 704 and the processor 702 may be considered machine-readable media 722 (e.g., tangible and non-transitory machine-readable media). The instructions 724 may be transmitted or received over a network 726 via the network interface device 720. For example, the network interface device 720 may communicate the instructions 724 using any one or more transfer protocols (e.g., HTTP). The machine 700 may also represent example means for performing any of the functions described herein, including the processes described in FIGS. 1-6.

In some example embodiments, the machine 700 may be a portable computing device, such as a smart phone or tablet computer, and have one or more additional input components (e.g., sensors or gauges) (not shown). Examples of such input components include an image input component (e.g., one or more cameras), an audio input component (e.g., a microphone), a location input component (e.g., a GPS receiver), an orientation component (e.g., a gyroscope), a motion detection component (e.g., one or more accelerometers), and an altitude detection component (e.g., an altimeter). Inputs harvested by any one or more of these input components may be accessible and available for use by any of the modules described herein.

As used herein, the term "memory" refers to a machine-readable medium 722 able to store data temporarily or permanently and may be taken to include, but not be limited to, random-access memory (RAM), read-only memory (ROM), buffer memory, flash memory, and cache memory. While the machine-readable medium 722 is shown in an example embodiment to be a single medium, the term "machine-readable medium" should be taken to include a single medium or multiple media (e.g., a centralized or distributed database 115 as depicted in FIG. 1 or FIG. 2, or associated caches and servers) able to store instructions 724. The term "machine-readable medium" shall also be taken to include any medium, or combination of multiple media, that is capable of storing the instructions 724 for execution by the machine 700, such that the instructions 724, when executed by one or more processors of the machine 700 (e.g., processor 702), cause the machine 700 to perform any one or more of the methodologies described herein, in whole or in part. Accordingly, a "machine-readable medium" refers to a single storage apparatus or device 130 or 150, as well as cloud-based storage systems or storage networks that include multiple storage apparatus or devices 130 or 150. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Furthermore, the machine-readable medium 722 is non-transitory in that it does not embody a propagating signal. However, labeling the tangible machine-readable medium 722 as "non-transitory" should not be construed to mean that the medium is incapable of movement; the medium should be considered as being transportable from one physical location to another. Additionally, since the machine-readable medium 722 is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium 722 or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 702 or a group of processors 702) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor 702 or other programmable processor 702. It will be appreciated that the decision to implement a hardware module mechanically, in dedicated and permanently configured circuitry, or in temporarily configured circuitry (e.g., configured by software) may be driven by cost and time considerations.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses 708) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 702 that are temporarily configured (e.g., by software) or permanently configured to perform the relevant operations. Whether temporarily or permanently configured, such processors 702 may constitute processor-implemented modules that operate to perform one or more operations or functions described herein. As used herein, "processor-implemented module" refers to a hardware module implemented using one or more processors 702.

Similarly, the methods described herein may be at least partially processor-implemented, a processor 702 being an example of hardware. For example, at least some of the operations of a method may be performed by one or more processors 702 or processor-implemented modules. As used herein, "processor-implemented module" refers to a hardware module in which the hardware includes one or more processors 702. Moreover, the one or more processors 702 may also operate to support performance of the relevant operations in a "cloud computing" environment or as a "software as a service" (SaaS). For example, at least some of the operations may be performed by a group of computers (as examples of machines 700 including processors 702), with these operations being accessible via a network 726 (e.g., the Internet) and via one or more appropriate interfaces (e.g., an application program interface or "API").

The performance of certain operations may be distributed among the one or more processors 702, not only residing within a single machine 700, but deployed across a number of machines 700. In some example embodiments, the one or more processors 702 or processor-implemented modules may be located in a single geographic location (e.g., within a home environment, an office environment, or a server farm). In other example embodiments, the one or more processors 702 or processor-implemented modules may be distributed across a number of geographic locations.

Unless specifically stated otherwise, discussions herein using words such as "processing," "computing," "calculating," "determining," "presenting," "displaying," or the like may refer to actions or processes of a knowledge analysis system 230 (e.g., a on a computing device or external server such as server machine 110 depicted in FIG. 1 or as part of a system of interconnected systems and devices as depicted in FIG. 2) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The present disclosure is illustrative and not limiting. Further modifications will be apparent to one skilled in the art in light of this disclosure and are intended to fall within the scope of the appended claims.

What is claimed is:

1. A method for relaying contextually relevant actions, the method comprising:
    accessing a communication between a first user and a second user;
    identifying at least one entity within the communication;
    predicting at least one contextually relevant action associated with the at least one entity, wherein predicting the at least one contextually relevant action comprises:
        identifying at least one relevant action associated with the identified entity;
        accessing a database of historical trends and activities of actions taken with respect to the identified entity;
        identifying amplifying words within the communication;

computing a correlation between the identified relevant action, the historical trends and activities, and identified amplifying words; and determining an hierarchy of contextually relevant actions as a function of the computed correlation;

selecting at least one contextually relevant action from the hierarchy of contextually relevant actions; and delivering the selected contextually relevant action to at least the second user.

2. The method of claim 1, wherein the communication accessed between first user and second user is a visual communication.

3. The method of claim 2, further comprising operably coupling the identified entity with the selected contextually relevant action.

4. The method of claim 3, wherein operably coupling the identified entity with the selected contextually relevant action comprises replacing the entity within the visual communication with the selected contextually relevant action.

5. The method of claim 1, wherein the communication accessed between first user and second user is an audio communication.

6. The method of claim 5, wherein delivering the selected contextually relevant action to at least the second user is by delivering a visual cue to at least the second user.

7. The method of claim 6, wherein the visual cue is a pane display of the identified entity and the selected contextually relevant action.

8. The method of claim 1, wherein selecting at least one contextually relevant action further comprises:
presenting the first user with at least one contextually relevant action with the highest computed correlation; and
receiving a confirmation from the first user to select the presented contextually relevant action.

9. The method of claim 1, further comprising delivering a secondary action with respect to a previously executed contextually relevant action.

10. A non-transitory computer readable medium comprising instructions that, when executed by a processor, cause the processor to perform operations comprising:
accessing a communication between a first user and a second user;
identifying at least one entity within the communication;
predicting at least one contextually relevant action associated with the at least one entity, wherein predicting the at least one contextually relevant action comprises:
identifying at least one relevant action associated with the identified entity;
accessing a database of historical trends and activities of actions taken with respect to the identified entity;
identifying amplifying words within the communication;
computing a correlation between the identified relevant action, the historical trends and activities, and identified amplifying words; and
determining an hierarchy of contextually relevant actions as a function of the computed correlation;
selecting at least one contextually relevant action from the hierarchy of contextually relevant actions; and
delivering the selected contextually relevant action to at least the second user.

11. The computer readable medium of claim 10, wherein the operations to access a communication between a first user and second user comprise accessing a visual communication.

12. The computer readable medium of claim 11, wherein the operations further comprise operably coupling the identified entity with the selected contextually relevant action.

13. The computer readable medium of claim 12, wherein the operations to operably couple the identified entity with the selected contextually relevant action comprise replacing the entity within the visual communication with the selected contextually relevant action.

14. The computer readable medium of claim 10, wherein the operations to access a communication between a first user and second user comprise accessing an audio communication.

15. The computer readable medium of claim 14, wherein the operations to deliver the selected contextually relevant action to at least the second user comprise delivering a visual cue to at least the second user.

16. The computer readable medium of claim 15, wherein the operations to deliver a visual cue comprise creating a pane display of the identified entity and the selected contextually relevant action.

17. The computer readable medium of claim 10, wherein the operations to select at least one contextually relevant action further comprises operations comprising:
presenting the first user with at least one contextually relevant action with the highest computed correlation; and
receiving a confirmation from the first user to select the presented contextually relevant action.

18. The computer readable medium of claim 17, wherein the operations further comprise delivering a secondary action with respect to a previously executed contextually relevant action.

19. A system comprising:
a data processor;
at least one computing device configured to create communications;
a knowledge analysis system operably coupled to the data processor and at least one computing device, the knowledge analysis system configured to execute instructions received from the data processor to:
access a communication between a first user and a second user;
identify at least one entity within the communication;
predict at least one contextually relevant action associated with the at least one entity, wherein the prediction of the at least one contextually relevant action comprises:
identifying at least one relevant action associated with the identified entity;
accessing a database of historical trends and activities of actions taken with respect to the identified entity;
identifying amplifying words within the communication;
computing a correlation between the identified relevant action, the historical trends and activities, and identified amplifying words; and
determining an hierarchy of contextually relevant actions as a function of the computed correlation;
selecting at least one contextually relevant action from the hierarchy of contextually relevant actions; and
deliver the selected contextually relevant action to at least the second user.

* * * * *